United States Patent
Green et al.

(10) Patent No.: US 8,577,561 B2
(45) Date of Patent: Nov. 5, 2013

(54) CONTROL SYSTEM AND METHOD OF OPERATING A PRODUCT DISTRIBUTION MACHINE

(75) Inventors: Lawrence D. Green, Bettendorf, IA (US); Donald K. Landphair, Bettendorf, IA (US)

(73) Assignee: Deere & Company, Moline, IL (US)

( * ) Notice: Subject to any disclaimer, the term of this patent is extended or adjusted under 35 U.S.C. 154(b) by 315 days.

(21) Appl. No.: 13/042,942

(22) Filed: Mar. 8, 2011

(65) Prior Publication Data

US 2012/0232691 A1 Sep. 13, 2012

(51) Int. Cl.
*A01B 79/00* (2006.01)
*A01C 7/20* (2006.01)

(52) U.S. Cl.
USPC .............................. 701/50; 111/200

(58) Field of Classification Search
USPC .................. 701/50, 1; 111/200, 900
See application file for complete search history.

(56) References Cited

U.S. PATENT DOCUMENTS

| | | |
|---|---|---|
| 6,389,999 B1 | 5/2002 | Duello |
| 6,701,857 B1 | 3/2004 | Jensen et al. |
| 7,571,688 B1 | 8/2009 | Friestad et al. |
| 2010/0010667 A1 | 1/2010 | Sauder et al. |
| 2010/0198529 A1 | 8/2010 | Sauder et al. |

FOREIGN PATENT DOCUMENTS

| | | |
|---|---|---|
| EP | 0372901 | 2/1994 |
| EP | 2353354 | 8/2011 |
| WO | 2008086283 | 7/2008 |
| WO | 2008086318 | 7/2008 |
| WO | 2009042238 | 4/2009 |

OTHER PUBLICATIONS

European Search Report received Jun. 6, 2012 (9 pages).

*Primary Examiner* — Christopher J Novosad

(57) ABSTRACT

A control system and method of operation of a product distribution apparatus or machine that uses map based information to disengage the dynamic down force control for certain designated areas of the field. These areas can be roadways or waterways that are not planted with seed but through which the machine does operate. The control system disengages the down force dynamic control when the designated areas are reached and leaves the down force applied by the actuator at the magnitude immediately prior to entering the area or at some other desired level. This magnitude of down force will typically be much closer to the magnitude needed when the roadway, waterway or other designated area has been crossed.

5 Claims, 2 Drawing Sheets

CONTROL SYSTEM AND METHOD OF OPERATING A PRODUCT DISTRIBUTION MACHINE

FIELD

This disclosure relates to a control system for and method of operating a product distribution machine and is described in the context of an agricultural seeding machine.

BACKGROUND

Modern agricultural implements for sowing seed or distributing other products such as fertilizers and chemicals typically have one or more row units for distributing product in rows in a field as the implement is moved over the field. Various types of implements are known, including, but not limited to planters, drills, air seeders and nutrient applicators. Such machines are referred to herein generally as a product distribution apparatus or machine. When the distributed product is placed under the soil surface, a furrow opener is used to open a furrow into which the product is deposited. The furrow is then closed, covering the product. A typically opener is a single or double disc opener having one or two discs oriented at a slight angle to the forward direction of travel. A depth regulation member is positioned near the opener to limit the penetration of the opener into the soil to produce a furrow of the desired depth.

A downward force is needed for the opener to penetrate the soil to the desire depth. When the opener is fully penetrating the soil, the depth regulating member, often in the form of a "gauge wheel," contacts the soil surface. The physical weight of the row unit together with the weight of any product stored on the row unit provides a downward force to help the opener penetrate the soil. However, this weight is often insufficient to ensure full penetration of the opener. It has long been the practice to provide supplemental down force to the row unit in the form of a mechanical spring arrangement. Such spring arrangements are adjustable so the operator can select a desired amount of supplemental down force before operating the implement. Changes in the amount of down force during operation is not possible.

More recently, the mechanical springs have been replaced with hydraulic or pneumatic actuators that allow the operator to make changes to the down force during machine operation. Changes are made through a control system that adjusts the hydraulic or pneumatic pressure delivered to each actuator. Even more recently, active or dynamic control of the down force is accomplished with a load sensor to measure to the soil reaction force on the depth regulation member. With dynamic control of the down force, a control system automatically operates the down force actuators by changing the system pressure in response to changing soil conditions in the field as the machine is moved over a field to achieve a desired soil reaction force on the depth regulation member.

Such active control systems can produce wide variations in the hydraulic or pneumatic pressures of the down force system as the machine moves through a field. A high capacity air compressor or hydraulic pump is needed to achieve the variation in a reasonable time. A high capacity system adds considerably to the overall cost. Large variations in the system pressures can be reduced by turning off the dynamic control of the down force for certain areas the field.

SUMMARY

A control system and method of operation of a product distribution apparatus is provided that uses map based field information to disengage the dynamic down force control for certain designated areas of the field. These areas can be roadways or waterways that are not planted with seed but through which the machine is operated. The harder soil in these areas causes the down force system to compensate by significantly increasing the pressure and thus the down force on the row unit. Once the area is crossed, and the machine returns to soil to be seeded, the down force is now much higher than needed, resulting in excessive soil compaction caused by the depth regulation member adjacent the furrow. The excessive soil compaction reduces crop yield. It may require several meters of travel before the down force can be reduced to the appropriate level.

The control system described below disengages the down force dynamic control when the designated areas are reached and leaves the down force applied by the actuator at the magnitude immediately prior to entering the area or at some other desired magnitude. This magnitude of down force will typically be much closer to the magnitude needed when the roadway, waterway or other designated area is crossed. By maintaining the down force in the designated area at the level prior to entering the area, upon exiting the area, the down force will be at a magnitude close to the desired amount.

DETAILED DESCRIPTION

Figure 1:
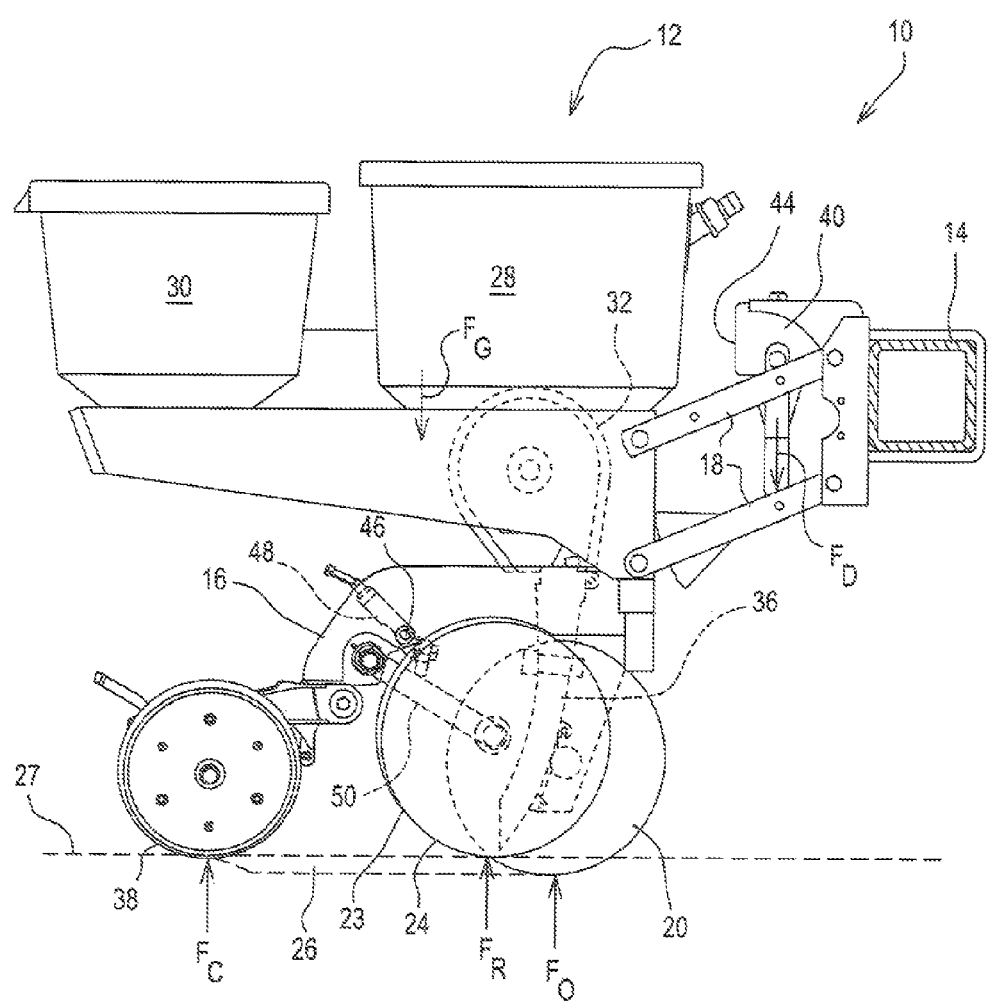
FIG. 1 is a side view of a common row unit of a row crop planter.
Figure 2:
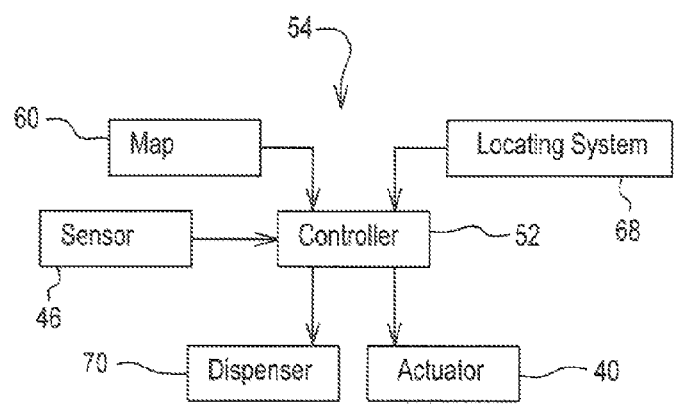
FIG. 2 is a schematic view of a control system for the dynamic down force system.

With Reference to FIG. 1, a portion of a seeding machine 10 is shown. Seeding machine 10 is in the form of a row crop planter but may also be other forms of machines. FIG. 1 illustrates a single row unit 12 of a multi-row planter, with each row unit 12 being substantially identical and connected to a machine frame shown as a tool bar 14. Only a single row unit 12 is shown and described below for simplicity sake.

Row unit 12 includes a row unit frame 16 which is attached to the tool bar 14 by parallel linkage 18. Tool bar 14 in turn is coupled to a traction unit (not shown), such as an agricultural tractor. For example, the tool bar may be coupled to an agricultural tractor using a draw bar or 3-point hitch assembly. Tool bar 14 may be coupled with transport wheel assemblies, marker arms, etc. which may be of conventional design and not shown for simplicity.

Row unit frame 16 carries a double disc furrow opener 20 for forming a seed furrow 26 in soil 27. A pair of gauge wheels 24 are provided which function as furrow depth regulation members and are respectively associated with the pair of discs of double disc furrow opener 20. More particularly, each gauge wheel 24 is positioned generally in line with and immediately adjacent to the outside of each respective disc of double disc furrow opener 20. The gauge wheels 24 may be vertically adjusted relative to the opener discs to adjust the depth of the furrow which is cut into the soil by the double disc furrow opener 20.

A seed meter 32 is also carried by row unit frame 16. Seed meter 32 receives seed from a seed hopper 28 carried above the seed meter on the frame 16. The seed meter drive is not shown but may be of the type shown in U.S. Pat. No. 7,571, 688 having a flexible cable drive with a clutch mechanism that enables the seed meter drive to be selectively disengaged to turn off the seed meter. Seed meter 32 delivers seed sequentially to a seed tube 36 through which the seed falls by gravity to the furrow 26. The seed meter 32 and seed tube 36 form a product dispenser to dispense product to the furrow 26. In this illustration, the product is seed but other meters can be used to dispense fertilizer, herbicides, insecticides or other chemicals.

A pair of closing wheels 38 follow behind the gauge wheels and are positioned generally in line with double disc furrow opener 20. Closing wheels 38 are preferably biased in a downward direction and have a peripheral edge with a shape which may vary, depending upon the application. Closing wheels 38 push soil back into the furrow 26 upon the product deposited therein.

The row unit 12 is equipped with a row unit down force actuator 40 in the form of an adjustable pneumatic down force cylinder 44. The row unit down force actuator 40 acts between the toll bar 14 and the lower links of the linkage 18 to apply down force on the row unit and the row unit components engaging the soil. The down force applied by the cylinder 44 ensures that the double disc furrow opener 20 is forming the furrow 26 to the desired depth. The down force applied to the row unit by the actuator 40 is shown by the arrow $F_D$. The row unit weight also produces a down force shown by the arrow $F_G$ acting through the center of gravity of the row unit. The force $F_G$ varies over time as the level of product in the seed hopper 28 and chemical hopper 30 changes during operation of the machine 10. These two downward acting forces, $F_D$ and $F_G$ are counter-acted by upward forces acting on the row unit. The opener penetrates the soil and has a force $F_O$ acting upward on the opener. When the opener 20 is fully penetrating, the gauge wheels 24 will be in contact with the soil and a soil reaction force $F_R$ acts upward on the gauge wheels. An additional upward force on the row unit includes the force $F_C$ acting on the closing wheels 38.

A minimum soil reaction force $F_R$ is desired to ensure that the opener is fully penetrating the soil to the desired depth. If the opener is not fully penetrating, the gauge wheels will not touch the soil and $F_R$ will be zero. Thus, some level of force $F_R$ greater than zero is desired to ensure there is full penetration. The magnitude of the force $F_R$ can be measured by a sensor or load cell in a variety of locations on the row unit. One example is a load sensing pin 46 in the gauge wheel depth adjustment link 48. Adjustment link 48 bears against and resists upward movement of the pivot arm 50 supporting the gauge wheels 24. A suitable load sensing pin is shown in WO2008/086283 A2. A controller 52 of a control system 54 receives a sensor output signal from the load sensing pin 46 and controls the pressure in the cylinder 44 accordingly to achieve the desired soil reaction force $F_R$ on the gauge wheels.

As the machine 10 is moved through a field, the soil conditions will not be constant. In some areas of the field, the soil will be harder than in other areas. When the soil is harder, the force $F_O$ required for full opener penetration will increase. If the down force $F_D$ applied to the row unit remains constant, the soil reaction force $F_R$ and the closing wheel force $F_C$ will decrease and possibly go to zero. To avoid this, the controller 52 dynamically or actively monitors the output of the sensor 46. As the force $F_R$ decreases, with harder soil, the controller will operate the actuator 40 to increase the down force $E_D$ acting on the row unit to maintain the desired force $F_R$ on the gauge wheels. Likewise, if the force $F_R$ increases, with softer soil, the controller 52 will operate the actuator 40 to reduce the down force $F_D$. Operation of the actuator 40 is accomplished by commanding a change in the air pressure for the pneumatic down force cylinder 44. The associated air compressor and valves are not shown but are well known. Hydraulic or electrical actuators could also be used to apply the down force $F_D$ and are actuated to very the down force $F_D$.

While the row unit 12 is shown with the sensor 46, it is possible to use one sensor 46 on one row unit to measure the force $F_R$ on the gauge wheels of that row unit while the controller receiving the sensor 46 output signal then controls the actuators 40 of multiple row units. This reduces the control system complexity and cost. Some machines may be configured with multiple row units carried as a gang on a movable frame. With such an arrangement, a single actuator 40 can apply down force to multiple row units. All such variations in the configuration of the machine 10 are contemplated in the following claims.

Figure 3:
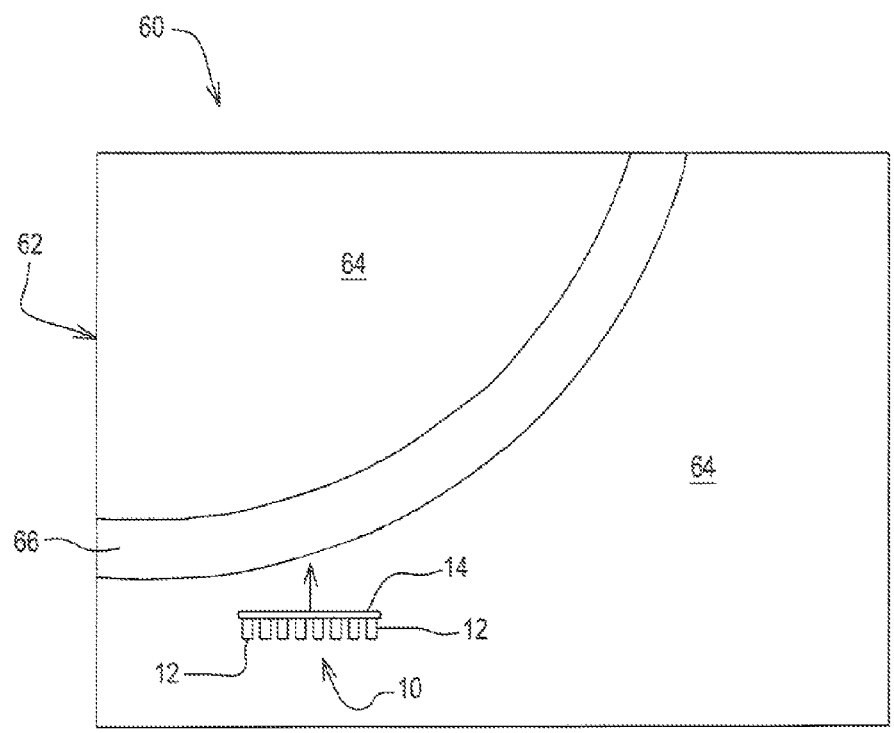
FIG. 3 is a plan view of a field map.

Large fluctuations in the soil hardness will require a longer time for the control system to adjust and change the down force $F_D$. The length of time is a function of the system capacity, such as the air compressor used to supply pneumatic pressure to the cylinder 44. One way to reduce the adjustment time is to increase the system capacity. This also increases the system cost. Some fluctuations in the down force can be anticipated and planned for based on an electronic field map. With reference to FIG. 3, a map 60 of a portion of a field 62 is shown. The field includes first areas 64 that are to be seeded or have other products applied thereto. Cutting through the field is a second field area shown as a waterway 66. Waterway 66 is typically covered in a perennial grass to avoid or reduce erosion from the field. The soil in the waterway is typically much harder than the soil in the first field areas 64. When a row unit enters the waterway, the force, $F_O$, on the opener to achieve full penetration will dramatically increase, and the soil reaction force $F_R$ on the gauge wheels will decrease. This results in the controller commanding an increase in the down force $F_D$ to return the soil reaction force $F_R$ to the desired magnitude. When the row unit then returns to the first area 64, the down force $F_D$ is much higher than needed, resulting in undesirable compaction of the soil adjacent the furrow 26. The machine may have to travel several meters before the system reaches the desired lower down force $F_D$. Since the waterway is not used to produce a crop, proper penetration of the opener 20 is not required in the waterway 66.

To avoid the large fluctuations in the down force $F_D$, the control system is programmed to not operate the actuator 40 while the row unit is in the waterway. By not operating the actuator, it is meant that the system pressure is not changed and a constant magnitude of down force is maintained. This is accomplished by including in the control system 54 a memory with an electronic field map 60 (FIG. 3) with the location of the first field areas 64 and second field area 66 identified. The memory with the field map is accessible by the controller 52. In addition, the control system 54 includes a machine locating system 68 such as a satellite based global positioning system or a local positioning system. The locating system provides an output to the controller indicative of the machine location to enable the controller to determine the location of the machine in the field. In FIG. 3, the machine 10 shown by the tool bar 14 and row units 12 is about to move from the first field area 64 into the second field area 66. When the row unit exits the first field area 64 and enters the second field area 66, the controller no longer operates the actuator 40 and instead leaves the actuator at the pressure and down force $F_D$ that existed immediately prior to exiting the first area 64. Then, when the row unit returns to the first field area 64 after crossing the waterway 66, the dynamic control of the down force $F_D$ resumes at a pressure likely close to the needed pressure to produce the desired soil reaction force $F_R$ on the gauge wheels 24. Switching on and off of the dynamic control of the down force can be done on individual row units at a time, a section of row units at a time or on all row units of the machine at a time.

As an alternative, the control system may be programmed to produce a different desired soil reaction force $F_{R1}$ while in the second field area. The desired and thus commanded force $F_{R1}$ in the waterway may be a lesser force than $F_R$ to reduce wear on the row unit while traveling through the waterway. As a further alternative, the control system can be programmed such that, while in the waterway, as the row unit approaches the first field area 64, the system pressure changes from that needed to produce a soil reaction force of $F_{R1}$ in the waterway to the pressure previously needed to produce a soil reaction force of $F_R$ in the first field area. Then, upon returning to the first field area, the pressure the pneumatic system is close to the needed pressure to produce the desired reaction force $F_R$. This results in a relatively short time and travel distance needed to achieve the desired soil reaction force $F_R$ once the row unit returns to the first field area and dynamic control of the down force is resumed.

Returning once again to FIG. 1, the seed meter 32 and the seed tube 36 constitute a produce dispenser 70 as that term is used in the following claims. The controller 52 also controls operation of the dispenser 70, by controlling the operation of the seed meter through the clutch mechanism previously described. (In some machines, operation of the dispenser is controlled through valves or gates to stop the flow of product rather than by stopping the meter drive mechanism.) In many instances, it will be desired to cease operating the dispenser 70 when the row unit is in the second field area. In such a case, the controller 52 may cease operating the dispenser 70 and cease the dynamic control of the actuator 40 simultaneously when entering the second field area. Operation of the dispenser is then resumed simultaneously with resuming dynamic control of the down force actuator upon return to the first field area.

In some machine forms, such as an air seeder, the seed meter is located remotely from the row unit and furrow opener. A lengthy pneumatic distribution system delivers seed from the meter to the furrow. In such a machine, the seed meter and distribution system form the product dispenser, which still terminates in a tube delivering product to the furrow. With such a machine, the control system 54 will still operate both the product dispenser and the down force actuator 40. But when approaching waterway 66, the dispenser will be shut-off before the waterway is entered allowing the product in the pneumatic distribution system to be dispensed prior to reaching the waterway. When the waterway is reached, the dynamic control of the actuator 40 is ceased. Prior to return to the first field area, the product dispenser is activated to fill the distribution system by the time the row unit reaches the first field area. The dynamic control of the down force actuator resumes upon returning to the first field area.

Depending on the farming practice, the dispensers may or may not be operated in the waterway. Paths or roadways cutting across the field are other types of field areas for which it may be desirable to stop the dynamic operation of the down force actuator 40.

Having described the control system and method, it will become apparent that various modifications can be made without departing from the scope of the accompanying claims.

What is claimed is:

1. A method of controlling a product distribution apparatus, the apparatus having at least one furrow opener and a furrow depth regulation member associated with the furrow opener, a product dispenser operable to dispense product into the furrow, a down force actuator operable to apply a down force to the furrow opener and furrow depth regulation member to produce a desired soil reaction force on the depth regulation member, a sensor to measure the soil reaction force, a controller adapted to operate the dispenser and the actuator and a locating system to determine the location of the apparatus operatively coupled to the controller, the method comprising the steps of:
    moving the apparatus over a field;
    dynamically monitoring an output of the sensor and operating the actuator in response to a sensor output to vary the down force to produce the desired soil reaction force on the depth regulation member when the furrow opener is in a first area of the field and disabling operation of the actuator in response to the sensor output when the furrow opener is a second area of the field; and
    using an electronic field map stored in a memory accessible by the controller and an output from the locating system to determine when the furrow opener is in the second area of the field.

2. A product distribution apparatus comprising:
    at least one furrow opener;
    a furrow depth regulation member associated with the furrow opener;
    a product dispenser operable to dispense product into the furrow;
    a down force actuator operable to apply a down force to the furrow opener and furrow depth regulation member to produce a desired soil reaction force on the depth regulation member;
    a sensor to measure the soil reaction force and produce an output indicative of the soil reaction force;
    a locating system to determine the location of the apparatus and produce an output signal indicative of the location of the apparatus;
    a memory adapted to store a field map defining first and second field areas; and
    a controller adapted to operate the dispenser and the actuator as the apparatus is moved over a field, the controller having access to the field map and dynamically receiving the output from the sensor and operating the actuator in response to an output of the sensor to produce the desired soil reaction force, the controller further receiving the output from the locating system and the controller further adapted to cease dynamic operation of the actuator when the furrow opener is in the second field area and to maintain a constant down force on the row unit when the furrow opener is in the second field area and the furrow opener remains engaged in the soil.

3. The apparatus of claim 2 wherein the controller is adapted to maintain the down force on the furrow opener and furrow depth regulation member when the furrow opener is in the second field area at a magnitude of down force immediately prior to the furrow opener entering the second field area.

4. The apparatus of claim 2 wherein the controller is adapted to cease operating the product dispenser so that product is not delivered to the furrow when the furrow opener is in the second field area.

5. The apparatus of claim 2 wherein a furrow opener, a furrow depth regulation member and a product dispenser operable to dispense product into the furrow are all part of a row unit and wherein the controller is adapted to stop operation of the dispenser and cease dynamic operation of the actuator simultaneously and to restart operation of the dispenser and dynamic operation of the actuator simultaneously.

* * * * *